(12) United States Patent
Boday et al.

(10) Patent No.: US 9,120,899 B1
(45) Date of Patent: Sep. 1, 2015

(54) PREPARATION OF FUNCTIONAL POLYSULFONES

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/293,731

(22) Filed: Jun. 2, 2014

(51) Int. Cl.
| | |
|---|---|
| C08G 75/04 | (2006.01) |
| C08G 75/20 | (2006.01) |
| C08L 81/06 | (2006.01) |
| C08L 79/04 | (2006.01) |

(52) U.S. Cl.
CPC .................. C08G 75/20 (2013.01); C08L 79/04 (2013.01); C08L 81/06 (2013.01)

(58) Field of Classification Search
CPC .................................. C08L 79/04; C08L 81/06
USPC ......................................................... 528/374
See application file for complete search history.

(56) References Cited

U.S. PATENT DOCUMENTS

| | | | |
|---|---|---|---|
| 2,889,277 A | 6/1959 | Hughes | |
| 3,340,232 A | 9/1967 | Smith et al. | |
| 3,598,748 A | 8/1971 | Hirosawa | |
| 3,957,742 A | 5/1976 | Kveton | |
| 4,106,904 A | 8/1978 | Oude Alink et al. | |
| 4,224,417 A | 9/1980 | Hajek et al. | |
| 4,225,481 A | 9/1980 | Wagner | |
| 4,246,160 A | 1/1981 | Wagner et al. | |
| 4,301,262 A | 11/1981 | Wagner et al. | |
| 4,877,451 A | 10/1989 | Winnik et al. | |
| 5,112,796 A | 5/1992 | Iannicelli | |
| 5,674,377 A | 10/1997 | Sullivan, III et al. | |
| 5,830,243 A | 11/1998 | Wolak et al. | |
| 7,384,434 B2 | 6/2008 | Malfer et al. | |
| 2010/0048756 A1* | 2/2010 | Loccufier et al. ............... 522/10 |

(Continued)

FOREIGN PATENT DOCUMENTS

| | | |
|---|---|---|
| CN | 101265255 A | 9/2008 |
| EP | 2636697 A1 | 9/2013 |

(Continued)

OTHER PUBLICATIONS

Henri Ulrich et al., Reaction of Chloromethyl Ether with Primary Amines, May 1961, pp. 1637-1638.

(Continued)

*Primary Examiner* — Shane Fang
(74) *Attorney, Agent, or Firm* — Patterson & Sheridan, LLP

(57) ABSTRACT

Polysulfones and methods for forming polysulfones are disclosed herein. The polysulfones are prepared from thiols and hexahydrotriazines. The thiols may be, for example, dithiols, trithiols, monothiols, or mixtures thereof. The thiols and hexahydrotriazines may be polymerized to form a polythioether. The polythioether may thereafter be oxidized to form a polysulfone. The polysulfones are prepared from an efficient and simple synthetic method, and the properties of the prepared polysulfones can be readily tuned. The prepared polysulfones may have improved thermal properties, improved mechanical properties, and enhanced functionality.

10 Claims, 3 Drawing Sheets

(56) References Cited

U.S. PATENT DOCUMENTS

2010/0107476 A1   5/2010   Cosimbescu
2012/0049308 A1   3/2012   Nishimura et al.

FOREIGN PATENT DOCUMENTS

| GB | 928112 A | 6/1963 |
|---|---|---|
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Hemant S. Patel et al., Studies on Synthesis and Characterization of some Novel Aromatic Copolyesters based on s-Triazine, Iranian Polymer Journal, vol. 14, No. 12, 2005, pp. 1090-1098.

Fabian Suriano et al., Functionalized cyclic carbonates: from synthesis and metal-free catalyzed ring-opening polymerization to applications, Polymer Chemistry, The Royal Society of Chemistry, 2011, pp. 528-533.

Hydrogen Sulfide Management, Mitigation options in petroleum refining, storage and transportation, White Paper, Baker Hughes, pp. 1-12.

Wang Yulan et al., Synthesis and Properties of Poly-1, 3, 5-Triazines, Polymer Communications, No. 2, 1984, pp. 117-123.

John Markoff, Error at IBM Lap Finds New Family of Materials, New York Times, May 15, 2014, 4 pages.

Jeanette M. Garcia et al., Recyclable, Strong Thermosets and Organogels via Paraformaldehyde Condensation with Diamines, Science AAAS, vol. 344, May 16, 2014, pp. 732-735.

D.R. Anderson et al., Thermally resistance polymers containing the s-triazine ring, Journal of Polymer Science Part A-1: Polymer Chemistry, vol. 4, Issue 7, pp. 1689-1702.

Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Hiller, et al., "Laser-engravable hexahydrotriazine polymer networks," Mat Res Innovat (2002) 6:179-184.

Oliver, et al. "Measurement of hardness and elastic modulus by; instrumented indentation: Advances in understanding and; refinements to methodology," J. Mater. Res., vol. 19, No. 1, Jan. 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckling-based metrology for measuring; the elastic moduli of polymeric thin films," Nature Materials_Aug. 3, 2004, 545-550;Published online: Jul. 11, 2004.

Ekinci et al., "Preparation, Characterization and H2O2 Selectivity of Hyperbranched Polyimides Containing Triazine", Journal of Polymer Research, 2005, pp. 205-210.

List of IBM Patents or Patent Applications Treated as Related, U.S. Appl. No. 14/293,731, filed Jun. 2, 2014, U.S. Appl. No. 14/618,089, filed Feb. 10, 2015, U.S. Appl. No. 14/517,052, filed Dec. 15, 2014.

* cited by examiner

PREPARATION OF FUNCTIONAL POLYSULFONES

INCORPORATION BY REFERENCE

The inventors herein incorporate by reference, application Ser. No. 14/050,995, filed in the USPTO on Oct. 10, 2013.

BACKGROUND

The present disclosure relates to polysulfones, and more specifically, to polysulfones prepared from hexahydrotriazines and thiols.

Polysulfones are commercially significant in part because polysulfones have high thermal and mechanical stability. Polysulfones are commercially applied as flame retardants, as dielectrics in capacitors, as filtration media, and in the automotive industry as a working plastic. However, many methods of forming polysulfones result in low yields and do not allow for widely tuneable properties. Additionally, many polysulfones lack tailorable functionalities.

A need exists for improved polysulfones and an improved method for forming the same.

SUMMARY

According to one embodiment of the present disclosure, a class of polysulfones having the following repeat unit is disclosed.

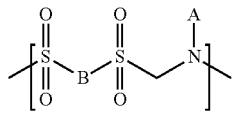

(1)

In the disclosed polysulfone, A is a substituted or unsubstituted alkane group, a substituted or unsubstituted alkene group, a substituted or unsubstituted alkyne group, a substituted or unsubstituted aromatic group, or a substituted or unsubstituted heterocyclic group. In the disclosed polysulfone, B is an alkane group, an aromatic group, an ether group, a thioether group, or a ketone group.

According to another embodiment of the present disclosure, a method of forming a polysulfone having the following repeat unit is disclosed.

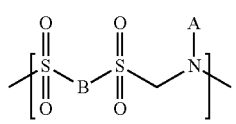

(1)

The method includes oxidizing a polythioether comprising the repeat unit

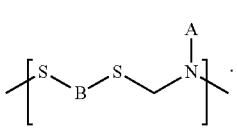

(8)

In the disclosed method, each A is independently selected from the group consisting of a substituted or unsubstituted alkane group, a substituted or unsubstituted alkene group, a substituted or unsubstituted alkyne group, a substituted or unsubstituted aromatic group, or a substituted or unsubstituted heterocyclic group. Also in the disclosed method, each B is independently selected from the group consisting of an alkane group, an aromatic group, an ether group, a thioether group, or a ketone group.

DETAILED DESCRIPTION

Figure 1:
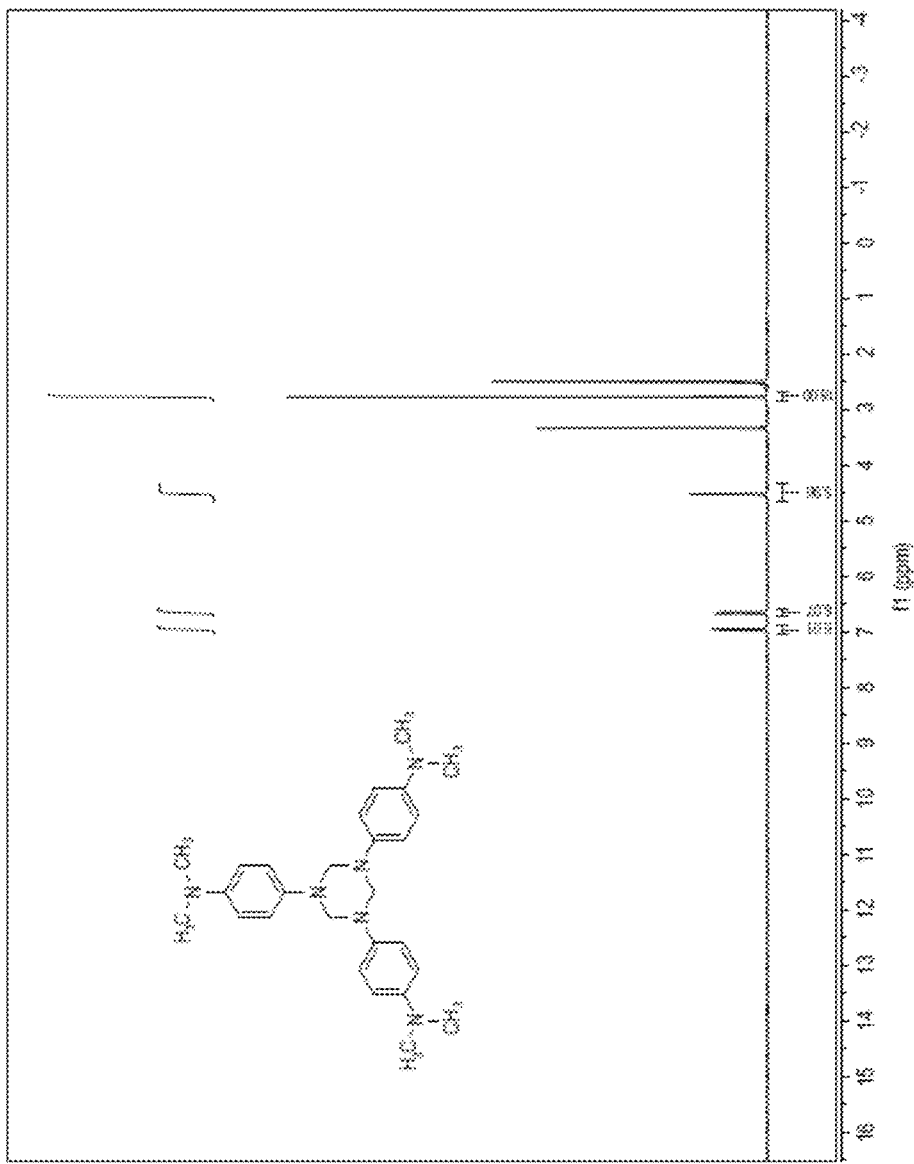
FIG. 1 is a $^1$H NMR spectrum of purified 4,4',4"-(1,3,5-triyl)tris(N,N-dimethylaniline) (Example 1).

Polysulfones and methods for preparing polysulfones from hexahydrotriazines and thiols are disclosed herein. More specifically, polysulfones comprising a repeat unit of the general formula (1) are disclosed.

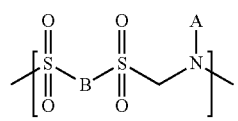

(1)

Monomers:

Hexahydrotriazines that may be used to form polysulfones of the general formula (1) may have the general formula (2).

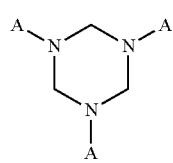

(2)

As shown in general formula (1), the A moiety is incorporated into the repeat unit of the polysulfones. The A moiety can be broadly varied, allowing for broad tailoring of the properties of the resulting polysulfones. In some embodiments, each A moiety may be the same or different. The A moiety may be a substituted or unsubstituted alkane group, a substituted or unsubstituted alkene group, a substituted or unsubstituted alkyne group, a substituted or unsubstituted aromatic group, or a substituted or unsubstituted heterocyclic group.

In embodiments where the A moiety is an alkane group, and alkene group, or an alkyne group, A may be linear, branched, or cyclic. The alkane, alkene, or alkyne groups may contain any number of carbon atoms. For example, the groups may contain between about 1 and about 10 carbon atoms, such as between about 1 and about 6 carbon atoms. The alkane, alkene, or alkyne groups may be substituted. For example, the alkane, alkene, or alkyne groups may contain carbon-halogen bonds. In embodiments including carbon-halogen bonds, the alkane, alkene, or alkyne groups may contain one or more bonds to one or more of fluorine, bromine, chlorine, or iodine. In other embodiments, the alkane, alkene, or alkyne groups may be substituted with one or more functional groups selected from the group consisting of aromatic groups, heterocyclic groups, amide groups, ether groups, alcohol groups, aldehyde groups, ketone groups, ester groups, and carboxylic acid groups.

In embodiments where the A moiety is aromatic, the A moiety may be, for example, an aryl group, such as a phenyl or naphthyl group. The aromatic group may be substituted with one or more functional groups. For example, the aromatic group may be substituted with one or more functional groups selected from the group consisting of alkane groups, alkene groups, alkyne groups, aromatic groups, heterocyclic groups, amide groups, ether groups, alcohol groups, aldehyde groups, ketone groups, ester groups, and carboxylic acid groups. These functional groups may provide cross-linking, improved adhesion, improved mechanical properties, improved thermal properties, and other improved properties. The substituent group may be positioned at the ortho, meta, or para position relative to the hexahydrotriazine ring. In one embodiment, the A moiety may be aniline or a substituted aniline, such as an N-substituted aniline. For example, in one embodiment, the A moiety may be N,N-dimethylaniline, and the structural formula of the hexahydrotriazine may be as follows:

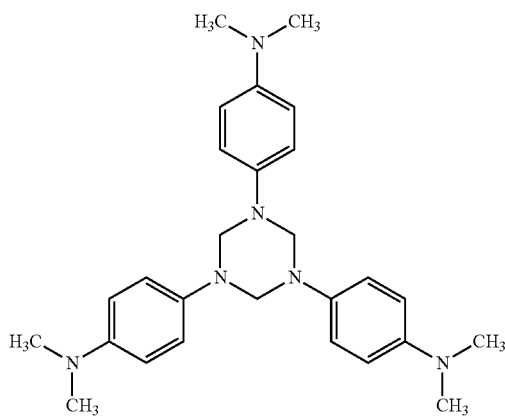

As shown above, the —[N(CH$_3$)$_2$] groups are in the para position relative to the hexahydrotriazine ring. In other embodiments, the —[N(CH$_3$)$_2$] groups may be in the ortho or meta position. In other embodiments, the A moiety may be N-methylaniline, aniline, phenol, cresol, halophenol, toluene, xylene, or others.

In still other embodiments, an aromatic A moiety may be a heteroaromatic group. The heteroatom may include one or more atoms selected from the group consisting of oxygen, nitrogen, and sulfur. Representative heteroaromatic groups include pyrrole, furan, thiophene, imidazole, pyrazole, oxazole, isoxazole, thiazole, isothiazole, pyridine, pyran, and thiopyran.

In embodiments where the A moiety is a heterocyclic group, the heterocyclic group may contain one or more atoms selected from the group consisting of nitrogen, oxygen, and sulfur. Representative heterocyclic groups include oxirane, tetrahydrofuran, tetrahydropyran, maleic anhydride, pyrrolidine, imidazolidine, pyrazolidine, piperidine, thiolane, and thiane. The heterocyclic group may also be substituted. For example, the heterocyclic group may be substituted with one or more functional groups selected from the group consisting of alkane groups, alkene groups, alkyne groups, aromatic groups, heterocyclic groups, amide groups, ether groups, alcohol groups, aldehyde groups, ketone groups, ester groups, and carboxylic acid groups.

Dithiols that may be used to form polysulfones of general formula (1) may have the general formula (3).

(3)

As shown in the general formula (1), the B moiety is incorporated into the repeat unit of the polysulfone. The B moiety can be broadly varied, allowing for broad tailoring of the properties of the resulting polysulfones. The B moiety may an alkane group, an aromatic group, an ether group, a thioether group, or a ketone group.

In embodiments where the B moiety is an alkane group, the alkane group may be linear, branched, or cyclic. The alkane group may contain any number of carbon atoms. For example, the alkane group may contain between about 1 and about 16 carbon atoms, such as between about 1 and about 10 carbon atoms. In some embodiments, the alkane group contains between about 4 and about 8 carbon atoms. In some embodiments, the alkane group contains 6 carbon atoms and is linear. In some embodiments, the alkane group contains 6 carbon atoms, is linear, and is non-substituted.

In embodiments where the B moiety is an alkane group, the alkane group may be substituted. For example, the alkane group may be substituted with one or more functional groups selected from the group consisting of trialkoxysilane groups, alcohol groups, alkene groups, alkyne groups, cyanate groups, carboxylic acid groups, ester groups, and phenolic groups.

In some embodiments, the B moiety has the general formula (4).

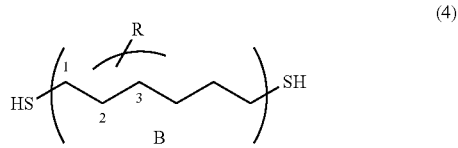

(4)

As indicated in the formula (4), a thiol group bonds to each terminal carbon of the B moiety. As shown above, an R group may be attached to any carbon in the chain. For example, the R group may be attached to the labeled 1, 2, or 3 carbon. In the general formula (4), R may be —H, —OH, —CO$_2$H, or —CO$_2$R'. In other embodiments, R may be:

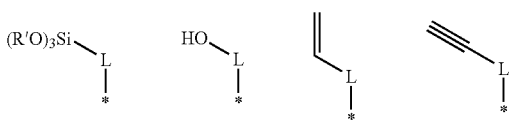

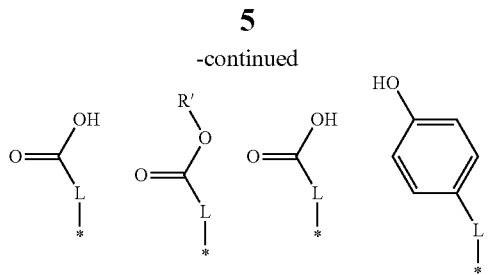

The * indicates the location on the R group where the R group bonds to the B moiety. L may be a linear, branched, or cyclic alkane group. In some embodiments, L may have between 1 and about 10 carbon atoms. For example, L may have between 1 and about 6 carbon atoms. In some embodiments, L has 4 carbon atoms. R' may be a linear, branched, or cyclic alkane group. In some embodiments, R' may have between 1 and about 4 carbon atoms. In some embodiments, R' has 2 carbon atoms. In other embodiments, an R group may be present on more than one carbon atom.

In embodiments where the B moiety is aromatic, the aromatic moiety may be, for example, an aryl group, such as a phenyl or naphthyl group. The aryl group may be substituted with one or more functional groups. For example, the aryl group may be substituted with one or more functional groups selected from the group consisting of alkane groups, alkene groups, alkyne groups, aromatic groups, heterocyclic groups, amide groups, ether groups, alcohol groups, aldehyde groups, ketone groups, ester groups, and carboxylic acid groups. In embodiments where the B moiety is an aromatic group, the resulting polythioether may be expected to have improved mechanical and thermal properties.

In embodiments where the B moiety is an ether group, a ketone group, or a thioether group, the B moiety may have the general formula (5).

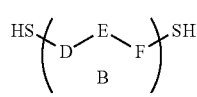 (5)

As indicated in the formula (5), a thiol group bonds to the terminal end of the D moiety and the terminal end of the F moiety. The E moiety may correspond to the —O— of an ether group, the >C=O of a ketone group, or the —S— of a thioether group. The D moiety and the F moiety may be alkane or aromatic. The alkane groups may be linear, branched, or cyclic. The aromatic group may be an aryl group, such as a phenyl group, and may be substituted or unsubstituted. The ether group, ketone group, or thioether group may be symmetrical or asymmetrical. In symmetrical embodiments, the D moiety and the F moiety are identical. In asymmetrical embodiments, the D and the F moieties are different. Representative embodiments where B is an ether group, a thioether group, or a ketone group are shown below.

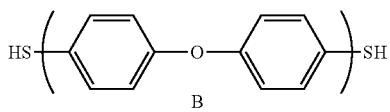

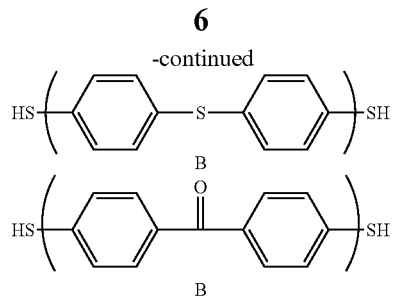

In some embodiments, a trithiol of the general formula (6) may be used to form the polysulfones.

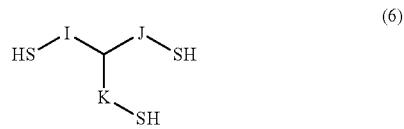 (6)

The trithiol may be used to form a cross-linked polysulfone. A crosslinked polysulfone may be more readily fabricated into a film and may have excellent mechanical and thermal properties. The I, J, and K moieties may be any moiety suitable for the B moiety.

In some embodiments, a monothiol of the general formula (7) may also be used to form the polysulfones.

 (7)

The E moiety may be any group suitable for the B moiety. The E moiety can be added to the polymerization reaction mixture in order to control the molecular weight or to provide end-capping functionalization. In some embodiments, the E moiety may include 2 or more reactive functional groups to allow for cross-linking An E moiety with 2 or more reactive functional groups may assist in forming films from the polysulfone.

Polymers and Polymerization

Polysulfones of the general formula (1) may be prepared by preparing and oxidizing a polythioether. The polythioether may have the general formula (8).

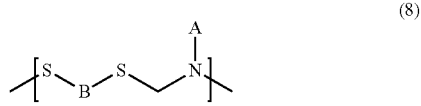 (8)

The polythioether of the general formula (8) may be prepared by reacting: [1] thiols of the formulas (3), (4), (5), and/or (6) with [2] hexahydrotriazines of the formula (2). The polymerization reaction may be, for example, a condensation polymerization reaction. In embodiments including trithiols of the formula (6) and dithiols of the formulas (3), (4), and/or (5), the molar ratio of dithiols to trithiols may be between about 1:1 and about 100:1, such as between about 1:1 and about 10:1, such as between about 1:1 and about 4:1. Optionally, the polymerization reaction may include monothiols of the general formula (7). In embodiments using monothiols of the general formula (7), the ratio of the combined moles of dithiol and trithiol to the moles of monothiol may be between about 10:1 and about 100:1, such as between about 50:1 and about 100:1. The ratio of the combined moles of thiol functional groups present in the thiols of formulas (3), (4), (5), (6), and (7) to moles of hexahydrotriazines with the general formula (2) may range from about 1.8:1 to about 2.1:1, such as about 2:1. In other embodiments, the ratio may be about 2.1:1. In other embodiments, the ratio may be between about 0.9:1 and about 1.1:1, such as about 1:1. In other embodiments, the ratio may be between about 1:1 and about 2:1. In embodiments where the ratio is greater than 2:1, the polymerization reaction may result in a crosslinked network. The number average molecular weight ($M_n$) of the resulting polymers may be between about 1000 g/mol and about 25,000 g/mol. In other embodiments, the $M_n$ may be greater than 25,000 g/mol. In still other embodiments, the $M_n$ may be less than 1,000 g/mol.

In embodiments including dithiols of the formula (3) to prepare polythioethers of the formula (8), each B moiety may be the same. Alternatively, some of the B moieties may be different from other of the B moieties. In embodiments where the B moieties differ, the polythioether may be a copolymer. In an embodiment including two distinct B moieties, the polythioether may be represented by general formula (9).

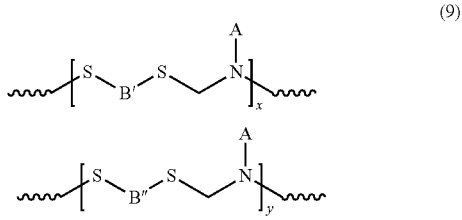

(9)

B' and B" represent the two distinct B moieties. The copolymer of formula (9) may be an alternating copolymer, periodic copolymer, statistical copolymer, random copolymer, block copolymer, linear copolymer, branched copolymer, or other type of copolymer. The ratio of x:y may be from between about 1:99 to about 99:1. In other embodiments, more than two distinct B moieties may be used.

The R moieties of the dithiols of the formula (4) may be the same in each molecule or may differ from molecule to molecule. Also likewise, the use of differing R moieties may result in a copolymer of formula (9). Using a variety of B or R moieties allows for further tailoring of the properties of the resulting polysulfone of the general formula (1). Similarly, the E moieties of the monothiols of the general formula (7) may be the same in each molecule or may differ from molecule to molecule. Likewise, the I, J, and K moieties of the trithiols of the general formula (6) may be the same in each molecule or may differ from molecule to molecule.

The A moieties in the hexahydrotriazines of the general formula (2) may be the same in each hexahydrotriazine molecule. For example, in each hexahydrotriazine molecule, the A moiety may be dimethylaniline. Alternatively, the A moieties in some of the molecules of hexahydrotriazines of the general formula (2) may differ from other molecules. In embodiments where the A moieties differ, the polythioether may be a copolymer. In an embodiment including two distinct A moieties, the polythioether may be represented by general formula (10).

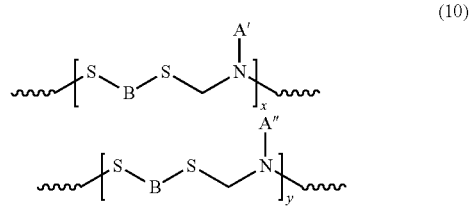

(10)

A' and A" represent the two distinct A moieties. The copolymer of formula (9) may be an alternating copolymer, periodic copolymer, statistical copolymer, random copolymer, block copolymer, linear copolymer, branched copolymer, or other type of copolymer. Using a variety of differing moieties allows for further tailoring of the properties of the resulting polysulfone of the general formula (1). The ratio of x:y may be from between about 1:99 to about 99:1. In other embodiments, more than two distinct A moieties are used. In some embodiments, more than one distinct A moiety is used and more than one distinct B moiety is used, resulting in a polymer with four distinct repeat units.

Representative reaction conditions for a condensation polymerization of the polythioether of the formula (8) from the above thiols include the following. The polymerization may be carried out at a temperature of between about −50° C. and about 150° C., such as between about 25° C. and about 30° C. The reaction may be performed under an inert atmosphere, such as a nitrogen or argon atmosphere. In embodiments where the thiols and the hexahydrotriazines are soluble or miscible in each other, a solvent may optionally be used. In other embodiments, the reaction may be carried out in any suitable solvent, for example chloroform or similar solvent. The polymerization may proceed for any suitable period of time, for example between about 1 hour and about 18 hours. The polymer may be isolated from solution by any suitable method or methods, for example, filtration, vacuum distillation, and precipitation. In some embodiments, the polythioether is not isolated from solution prior to the subsequent oxidation step that forms the polysulfone. In other words, the formation of the polysulfones may be a one pot synthesis from the thiols and hexahydrotriazines. The above conditions represent only typical conditions. For example, some embodiments may include polymerization temperatures outside of the above-provided temperature ranges and polymerization times outside of the above-provided time ranges. Specific examples of a condensation polymerization are discussed below.

After a polythioether of the formula (8) is synthesized, the polythioether can be oxidized to the polysulfone, as shown below.

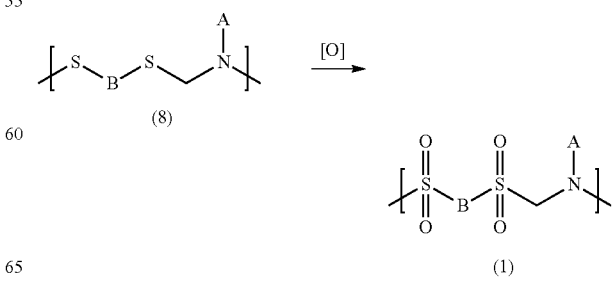

Representative reaction conditions for the oxidation of the polythioether of the formula (8) to the polysulfone of the formula (1) include the following. Suitable oxidizing agents include the following: peroxides (such as hydrogen peroxide and organic peroxides, including meta-chloroperoxybenzoic acid), oxone, potassium permanganate, $OsO_4$, $RuO_4$, $CrO_4$, $Cr_2O_7$. In other embodiments, other oxidizing agents may be used. The molar ratio of oxidizing agent to thioether functional group may be between about 0.05:1 and about 30:1. The oxidation reaction may be carried out at a temperature of between about −78° C. and about 100° C., such as between about −20° C. and about 50° C. The reaction may be carried out in chloroform or similar solvent. The oxidation reaction may proceed for between about 0.5 hours and about 48 hours. The polymer may be isolated from solution by any suitable method or methods, for example, filtration, vacuum distillation, and precipitation. The above conditions represent only typical conditions. For example, some embodiments may include reaction temperatures, reaction times, and oxidizing agent to thioether functional groups ratios outside of the above-provided ranges. In other embodiments, different oxidizing agents may be used. Specific examples of the oxidation reaction are discussed below.

The previously described embodiments have many advantages, including the following. The methods forming polysulfones result in high yields, and the polysulfones are easily prepared. In some embodiments, polysulfones are prepared from thiols and hexahydrotriazine in a one-pot synthesis. These methods allow for forming polysulfones with widely differing properties and thus allow polymer chemists to select or "tune" the properties of the resultant polymers according to end-use applications. Additionally, the polysulfones may have elastomeric properties and be selectively degradable. Moreover, the polysulfones may be easily applied as coatings. The polysulfones may also have robust mechanical properties and thermal stability. Additionally, the polysulfones may have high oxidative stability and a high glass transition temperature. The aforementioned advantages are illustrative and not limiting. It is not necessary for all embodiments to have all the advantages.

Representative Preparation of a Hexahydrotriazine Compound

Example 1

Reaction of aniline with paraformaldehyde to form the hexahydrotriazine compound 4,4',4''-(1,3,5-triazinane-1,3,5-triyl)tris(N,Ndimethylaniline) (HTPT)

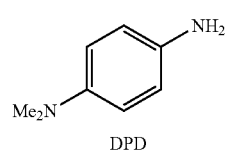
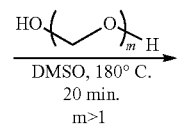

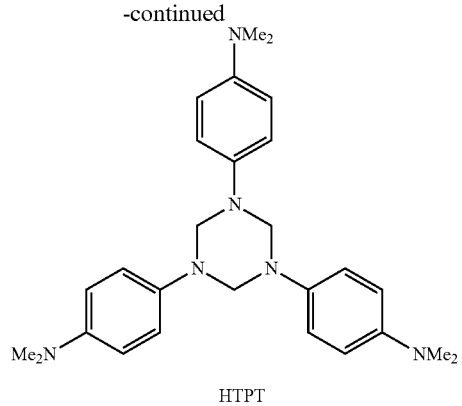

HTPT

N,N-dimethyl-p-phenylenediamine (DPD, 0.21 g, 0.15 mmol) and paraformaldehyde (PF, 0.0046 g, 0.15 mmol, 1 equivalent (eq.)) were weighed out into a 2-Dram vial inside a glovebox. Dimethylsulfoxide (DMSO) (0.91 g, 1.0 mL) was added to the vial. The reaction mixture was removed from the glovebox and heated in an oil bath at 180° C. for 20 minutes. The DMSO was removed in vacuo and 4,4',4''-(1,3,5-triazinane-1,3,5-triyl)tris(N,N-dimethylaniline) was collected as a brown solid (0.04 g, 79% yield).

The purified HTPT has a singlet resonating at delta 4.5 ppm (FIG. 1, $^1$H NMR spectrum) for the six methylene protons of HTPT. $^1$H NMR ($d_6$-DMSO, 400 MHz): delta 6.97 (d, 2H, J=8 Hz), 6.66 (d, 2H, J=8 Hz), 4.53 (s, 2H), 2.78 (s, 6H) ppm.

Thiols

Various dithiols corresponding to the general formulas (3), (4), and/or (5), trithiols corresponding to the general formula (6), and monothiols corresponding to the general formula (7) are commercially available from several manufactures, such as Fisher Scientific of Hampton, N.H., Sigma-Aldrich of St. Louis, Mo., or these components may be otherwise synthesized according to known procedures.

Polymerization of Thiols to Form Polythioethers

Example 2

Polymerization of HTPT with 1,6-hexanedithiol

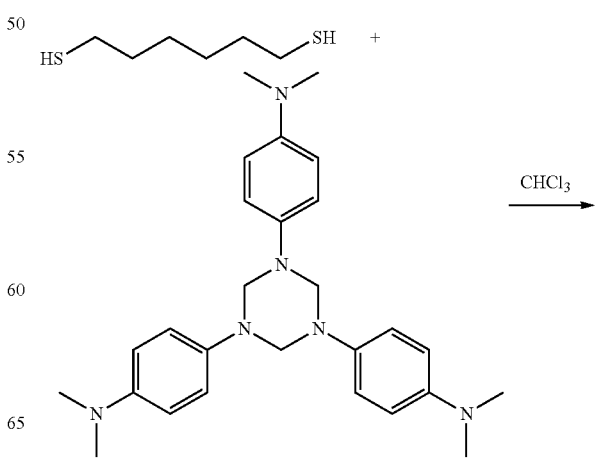

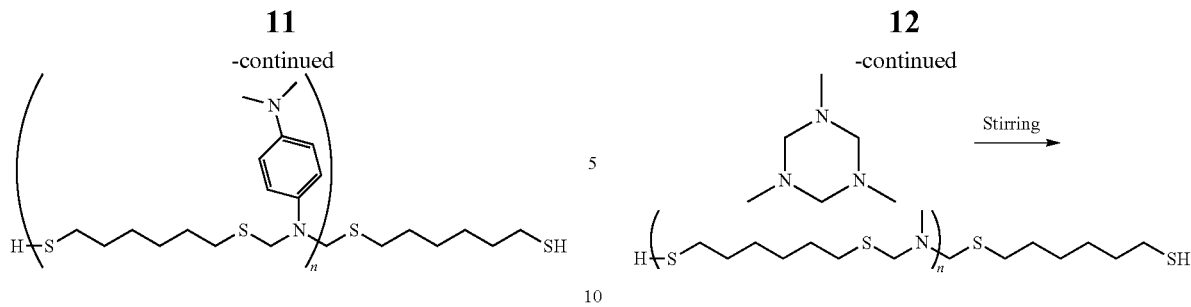

200 mg of the triazine (0.45 mmol) and 69 μL of hexane dithiol was added to a 10 mL round bottom flask. A stir bar was added followed by 3 mL of chloroform to bring the concentration of the triazine to 150 mM. The resulting solution was reacted under nitrogen over the course of 18 hrs.

Figure 2:
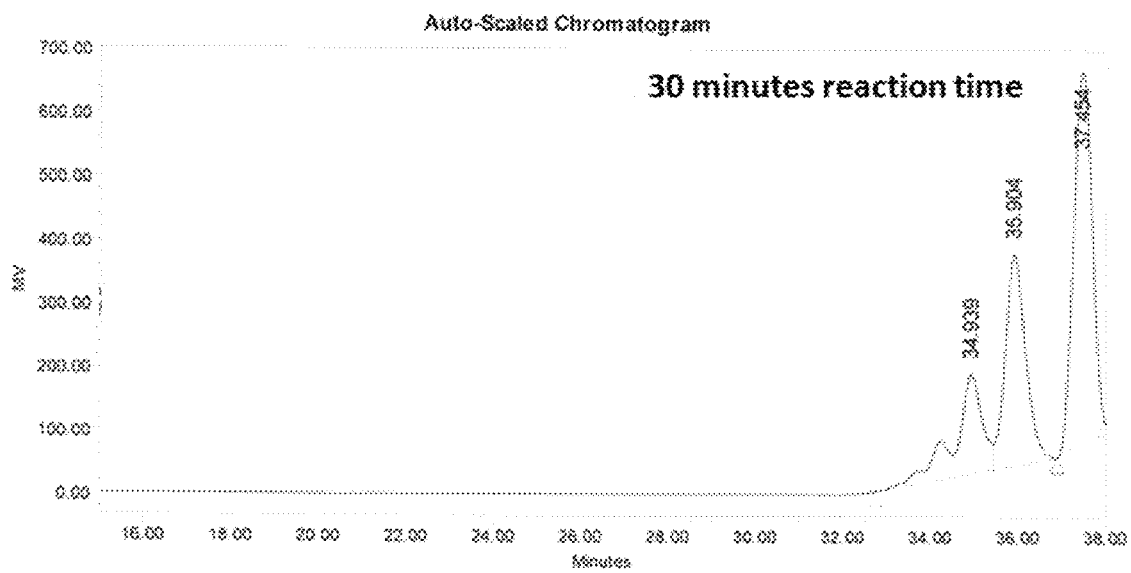
FIG. 2 is a gel permeation chromatography (GPC) spectrum of the intermediate polythioether (Example 2).

FIG. 2 illustrates a gel permeation chromatography (GPC) run used to characterize the polythioether of Example 2. The $M_w$ of the polythioether of Example 2 was approximated to be about 1200 g/mol.

Figure 3:
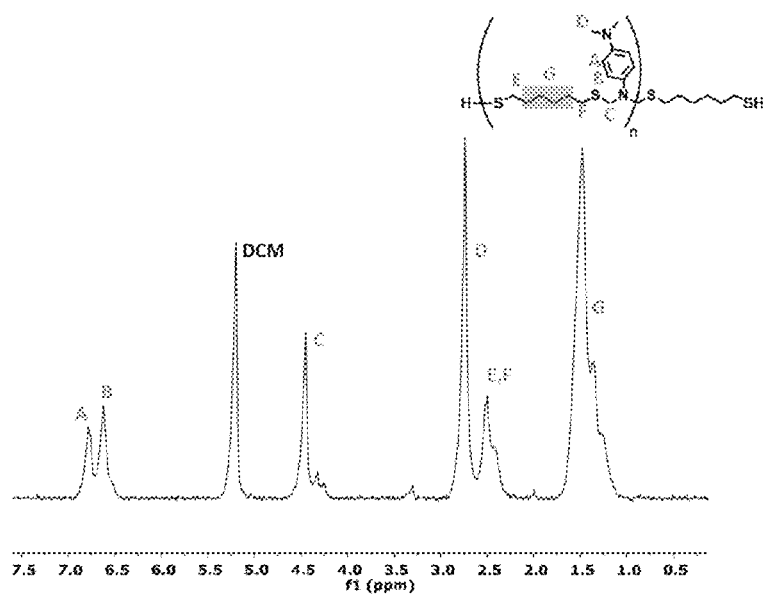
FIG. 3 is a $^1$H NMR spectrum of the intermediate polythioether (Example 2).

FIG. 3 illustrates a $^1$H NMR for the polythioether of Example 2. The purified polythioether has a singlet resonating at delta 6.8 ppm corresponding to the two protons A shown in FIG. 3, a singlet resonating at delta 6.6 corresponding to the two protons B shown in FIG. 3, a singlet resonating at delta 4.4 corresponding the two protons C shown in FIG. 3, a singlet resonating at delta 2.7 corresponding to the six protons D shown in FIG. 3, a multiplet resonating at from about 2.3 to about 2.6 corresponding to the two protons E and the two protons F shown in FIG. 3, a multiplet resonating at a delta from about 1.3 to about 1.6 corresponding the eight protons G shown in FIG. 3. Significant peak broadening, a characteristic of stepwise polymerizations, is also observed in the $^1$H NMR spectrum.

Example 3

Polymerization of 1,3,5-trimethyl-1,3,5-triazinane with 1,6-hexanedithiol

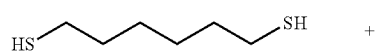

1 mL of the triazine (7.1 mmol) was added to a 20 mL vial with screw cap top followed by 1.284 mL of hexane dithiol (1 eq.). A stir bar was added and nitrogen was blown into the reaction vial, and the vial was then sealed with the screw cap. The reaction was stirred at room temperature (ca. 25° C.) for a period of 18 hrs. The solution was noted to transform from a liquid material to an extremely viscous material overnight. This same reaction was also attempted with 2 eq. of dithiol (2.26 mL) under the same reaction conditions. Again a significant increase in viscosity was noted.

Figure 4:
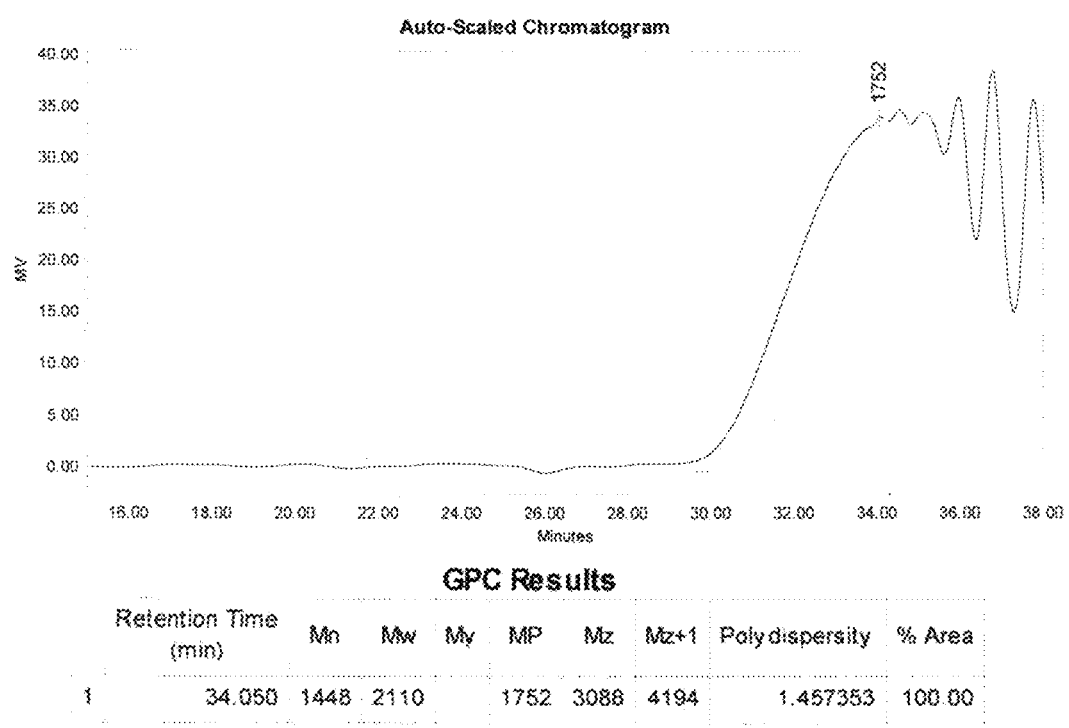
FIG. 4 illustrates a gel permeation chromatography (GPC) spectrograph of a polythioether (Example 3).

FIG. 4 illustrates a gel permeation chromatography (GPC) run used to characterize the polythioether of Example 3. The number average molecular weight (Mn) of the polythioether was approximately 1450 g/mol; the $M_w$ of the polythioether was approximately 2110 g/mol; and the polydispersity index (PDI) was approximately 1.5.

Conversion of Polythioethers to Polysulfones

Example 4

Conversion of the Polythioether of HTPT and 1,6-hexanedithiol to a Polysulfone

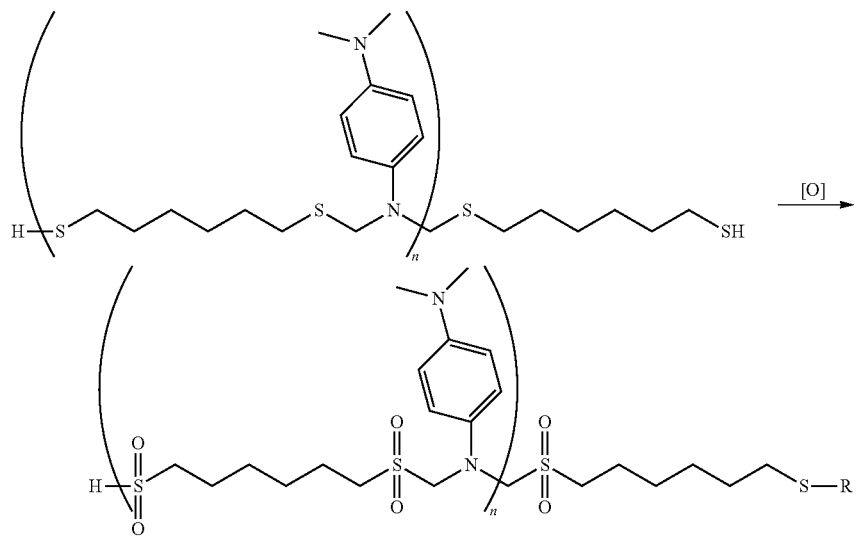

The polythioether of HTPT and 1,6-hexanedithiol may be converted to a polysulfone by reacting the polythioether with an oxidizing agent. For example, the oxidizing agent may be a peroxide. The molar ratio of oxidizing agent to thioether functional group may be between about 0.05:1 and about 30:1. The oxidation reaction may be carried out at a temperature of between about −20° C. and about 50° C. The reaction may be carried out in chloroform. The oxidation reaction may proceed for between about 12 hours. In the $^1$H NMR of the polysulfone, the E and F protons may shift downfield from about 2.5 ppm to about 3.0 ppm.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A polysulfone comprising a repeat unit of

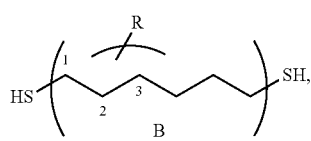

wherein A is a substituted or unsubstituted alkane group, a substituted or unsubstituted alkene group, a substituted or unsubstituted alkyne group, a substituted or unsubstituted aromatic group, or a substituted or unsubstituted heterocyclic group; and
wherein B is an alkane group, an aromatic group, an ether group, a thioether group, or a ketone group.

2. The polysulfone of claim 1, wherein B comprises an aromatic group.

3. The polysulfone of claim 1, wherein B comprises

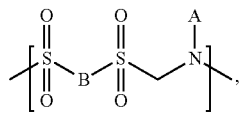

wherein R is bonded to the 2 or 3 carbon, and wherein R is selected from the group consisting of —H, —OH, —CO$_2$H, and —CO$_2$R', and wherein R' comprises an alkane group.

4. The polysulfone of claim 1, wherein B comprises

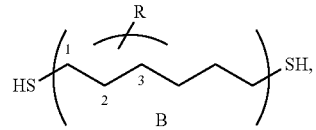

wherein R is bonded to the 2 or 3 carbon, and wherein R is selected from the group consisting of:

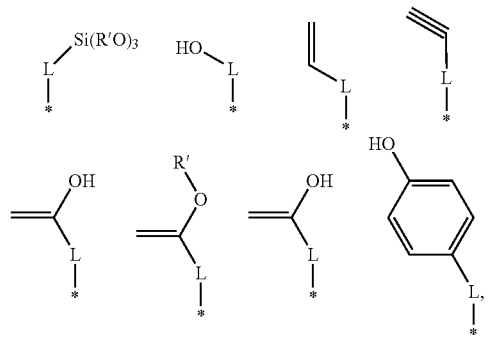

wherein R' comprises an alkane group, L comprises an alkane group, and wherein * indicates the location on the R where R bonds to the 2 or 3 carbon.

5. The polysulfone of claim 1, wherein A comprises an aromatic group.

6. The polysulfone of claim 5, wherein B comprises

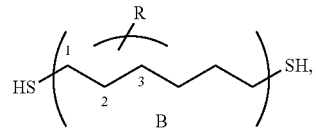

wherein R is bonded to the 2 or 3 carbon, and wherein R is selected from the group consisting of:

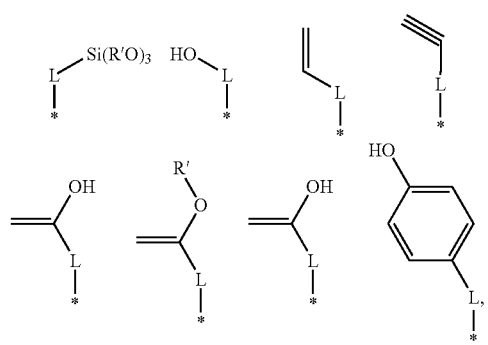

wherein R' comprises an alkane group, L comprises an alkane group, and wherein * indicates the location on the R where R bonds to the 2 or 3 carbon.

7. The polysulfone of claim 5, wherein A comprises a substituted aromatic group.

8. The polysulfone of claim 5, wherein A comprises an N,N-dimethylaniline group.

9. The polysulfone of claim 5, wherein B comprises —$CH_2CH_2CH_2CH_2CH_2CH_2$—.

10. The polysulfone of claim 9, wherein an $M_n$ is at least about 1000 g/mol.

* * * * *